Nov. 11, 1969  H. T. NILES  3,477,611
FUEL TANK HAVING REDUCED FUEL VAPOR EMISSION
Filed April 3, 1968  2 Sheets-Sheet 1

HAROLD T. NILES
INVENTOR
BY John R. Faulkner
Glenn S. Arendsen
ATTORNEYS

Nov. 11, 1969   H. T. NILES   3,477,611
FUEL TANK HAVING REDUCED FUEL VAPOR EMISSION
Filed April 3, 1968   2 Sheets-Sheet 2

HAROLD T. NILES
INVENTOR
BY
ATTORNEYS

United States Patent Office 3,477,611
Patented Nov. 11, 1969

3,477,611
FUEL TANK HAVING REDUCED FUEL VAPOR EMISSION
Harold T. Niles, Livonia, Mich., assignor to Ford Motor Company, Dearborn, Mich., a corporation of Delaware
Filed Apr. 3, 1968, Ser. No. 718,570
Int. Cl. B65b *3/00;* B67c *3/00;* B65d *51/16*
U.S. Cl. 220—86                                    11 Claims

ABSTRACT OF THE DISCLOSURE

A flexible impervious diaphragm fastened inside a relatively rigid fuel tank tends to rest on the surface of any fuel in the tank and thereby divides the tank into air and fuel chambers. A filler tube cap seats at two locations in the filler tube for the fuel tank and the air chamber is connected to the compartment formed in the filler tube between the two seats. A two-way check valve located in the cap between the compartment and the atmosphere permits air flow into the air chamber at a low pressure differential and permits air flow out of the air chamber at a higher pressure differential. A one-way check valve between the compartment and the fuel chamber prevents air flow into the fuel chamber while permitting fuel vapors to flow out of the fuel chamber only at a still higher pressure differential.

Summary of the invention

In recent years considerable efforts have been directed toward reducing the amount of fuel vapor lost from fuel tanks as a result of evaporation. Preventing such fuel vapor losses increases fuel economy and decreases vehicle emissions capable of producing smog. The problem is complicated by the need for air admission to the tank to compensate for the fuel removed from the tank for engine operation and the need to vent the tank to compensate for fuel vapor formation without permitting the vapors themselves to escape.

To reduce evaporation losses from the fuel tank, this invention utilizes a flexible impervious diaphragm fastened to the interior of the fuel tank and dividing the tank into air and fuel chambers. The fuel chamber communicates with a filler pipe for admitting fuel to the tank and with a fuel line for transmitting fuel to the engine. A check valve connects the air chamber to the atmosphere and permits air flow into and out of the air chamber with air flow out of the air chamber occurring at a pressure differential greater than that at which air flows into the air chamber. The diaphragm is sufficiently large and sufficiently flexible so that most of its area rests on the surface of the fuel in the lower chamber regardless of the amount of fuel and in the absence of large amounts of fuel vapor.

As the engine withdraws fuel from the fuel chamber, air is admitted through the check valve to the air chamber, thereby permitting continued fuel flow to the engine. Temperature induced fuel evaporation will lift portions of the diaphragm from the surface of the fuel, thereby compressing the air in the upper chamber; when the pressure in the air chamber reaches a predetermined point, a check valve permits some of the air to escape from the air chamber while containing any fuel vapors in the fuel chamber. In the event that fuel evaporation continues to the point where all of the air has been expelled from the air chamber, a second safety check valve vents some of the fuel vapors to the atmosphere to prevent the vapor pressure from bursting the fuel tank.

In a preferred tank construction, the check valves are included in the cap assembly for the filler tube. The cap assembly seats at two places in the filler tube and the compartment formed between the seats is connected to the air chamber of the fuel tank by a vent line. Check valves admitting air into and out of the air chamber are located in the outer cap assembly and the lower seat serves as the check valve for the fuel chamber. The cap assembly is retained on the filler tube by a double ramp arrangement so loosening the cap to the outer ramp vents the air chamber while holding the fuel vapors in the fuel chamber. Air then escaping from the air chamber reduces the temperature of the tank and diaphragm, which condenses some of the fuel vapors in the lower chamber. As fuel is added to the fuel chamber, the remaining air is expelled from the air chamber along with a greatly reduced quantity of fuel vapor from the fuel chamber.

Brief description of the drawings

FIGURES 2 and 3 together show the double ramp arrangement of the outer end of the filler tube that permits venting the air chamber prior to venting the fuel chamber when the filler cap is removed.

Detailed description

Figure 1:
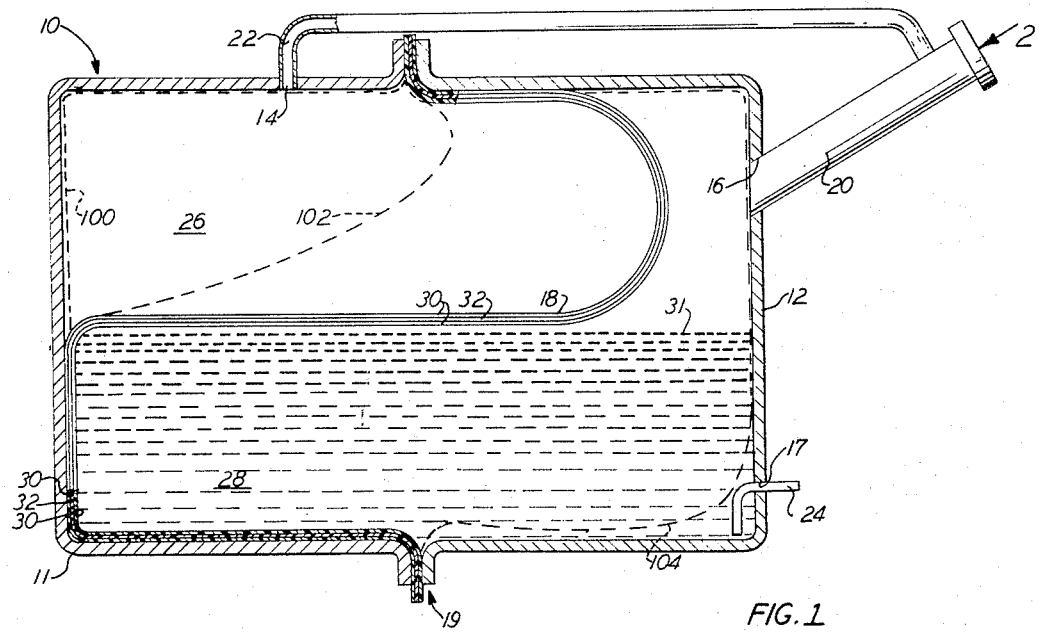
FIGURE 1 is a sectioned elevation of the end of a fuel tank of this invention showing the flexible diaphragm in place in a fuel tank approximately half full of fuel.

Referring to FIGURE 1, a sheet metal fuel tank 10 is made of left and right tank halves 11 and 12. A small vent opening 14 is formed in the upper portion of the tank half 11 and a larger opening 16 is formed in the upper part of a vertical wall of tank half 12. A smaller opening 17 is located in the lower part of the same wall.

A flexible, impermeable diaphragm 18 is formed to the shape of one tank half interior, and the tank halves are assembled together with the edges of the diaphragm clamped between the edges of the halves in a vertical seam 19. The filler tube 20 is located in opening 16 and a vent tube 22 has one end located in opening 14 and the other end connected to the upper portion of filler tube 20. A fuel line 22 leading to the engine extends through opening 17 and then turns downward to terminate near the bottom of the tank. Diaphragm 18 divides the fuel tank into an air chamber 26 and a fuel chamber 28 with filler tube 20 and fuel line 22 communicating with fuel chamber 28, and vent line 22 communicating with air chamber 26. Diaphragm 18 is sufficiently flexible so a considerable portion of the diaphragm rests on the surface of the fuel 31 in fuel chamber 28 regardless of the fuel level and in the absence of fuel vapor sufficient to lift the diaphragm off the surface. The diaphragm is hydrocarbon resistant and impervious to fuel vapor, and a preferred diaphragm construction consists of a laminate of a sheet of polyurethane 30 on each side of a sheet of nylon 32. The polyurethane sheets are approximately 0.015 inch thick and the nylon is approximately 0.002 inch thick.

Figures 2, 3:
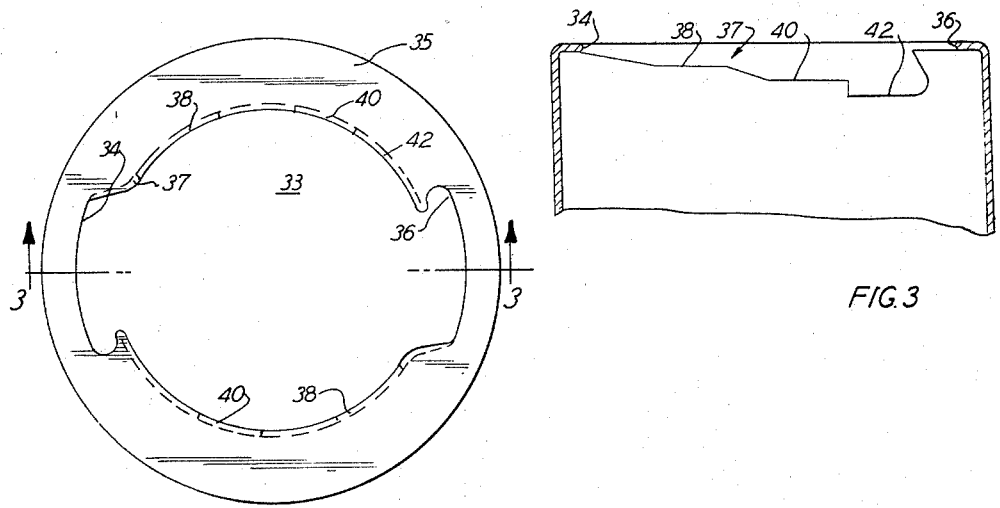
FIGURE 2 is an end view of the top of the filler neck taken in the direction of arrow 2 in FIGURE 1.
FIGURE 3 is a sectional view taken along line 3—3 in FIGURE 2.

Referring to FIGURE 2, the exterior opening of the filler tube 20 is folded inwardly to form a substantially circular portion 33 having two diametrically opposed ear portions 34 and 36. The folded portion has a flat outer surface 35 and the edge 37 turns downward around circular portion 33. Edge 37 progressively steps down from each ear portion to a first ramp 38 and a second lower ramp 40. A stop 42 is located at the end of ramp 40.

Figure 4:
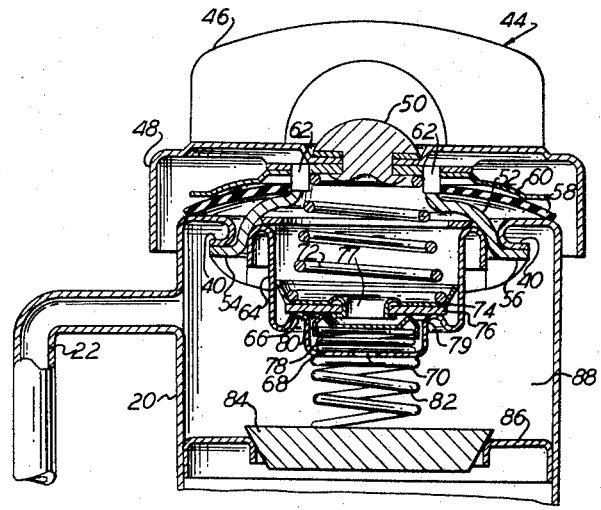
FIGURE 4 is a sectional view of the end portion of the filler neck showing the valve cap in position.

In FIGURE 4, a filler cap assembly for the filler tube is represented by numeral 44. Cap assembly 44 comprises a crown 46 having a depending skirt 48 projecting from its lower side. Skirt 48 has a slightly larger diameter than tube 20 and is sufficiently long to extend below the top of tube 20 when cap assembly 44 is in place. A rivet 50 fastens crown 46 to an inverted cup member 52. The main portion of member 52 is substantially circular and slightly smaller than the diameter of circular portion 33, but the lower edge of member 52 has two projecting tabs 54 and 56 that fit into ear portions 34 and 36. With tabs 54 and 56 located in portions 34 and 36, turning the cap assembly clockwise slides the tabs down the overturned edges 37 to ramp 38 and finally to ramp 40.

A sealing member 58 having a diameter approximately equal to the outside diameter of filler tube 20 extends outwardly above member 52 and is downwardly loaded by a spring 60 so member 58 contacts outer surface 35 of filler tube 20 when tabs 54 and 56 have been turned to ramps 40. Sealing member 58 can be made of rubber or a similar material. A series of small holes 62 extend through sealing member 58 and spring 60 to connect the interior of member 52 with the space inside skirt 48.

An upright cup member 64 has its larger end soldered or otherwise sealingly fastened to the inside surface of member 52. The walls of member 64 are generally straight but roll inward and upward near the lower end thereof to form an annular seat 66. Below seat 66 the walls again turn inwardly into a flat portion 68 that contains a hole 70.

Seating against the base of member 52 is a compressive spring 72 that bears on a valve disc 74, normally urging the seal material 76 fastened to valve disc 74 onto seat 66. Disc 74 and seal material 76 contain a centrally located hole 77. A smaller compressive spring 78 seats against flat portion 68 of cup 64 and urges a projecting ridge 79 of a valve member 80 toward valve disc 74. Ridge 79 has a diameter smaller than seat 66 but larger than hole 77 and normally contacts the center portion of seal material 76.

A third compressive spring 82 is fastened to the exterior of flat portion 68 and urges a large valve member 84 onto an annular valve seat 86 fastened a short distance down filler tube 20. A compartment 88 thus is formed between seat 86 and the top of filler tube 20, and vent tube 22 communicates with compartment 88. Below seat 86, filler tube 18 communicates directly with lower portion 28.

Operation

Spring 72 and valve disc 74 with its attached seal material 76 serve as a check valve assembly permitting air to escape from compartment 88 and via vent tube 22 from air chamber 26 under an appropriate pressure differential. Spring 78 and valve member 80 serve as a check valve assembly permitting atmospheric air to enter compartment 88 and air chamber 26 under a different pressure differential, and spring 82 combined with valve member 84 serve as a check valve assembly permitting fuel vapors to escape from fuel chamber 28 under still another pressure differential.

Figure 5:
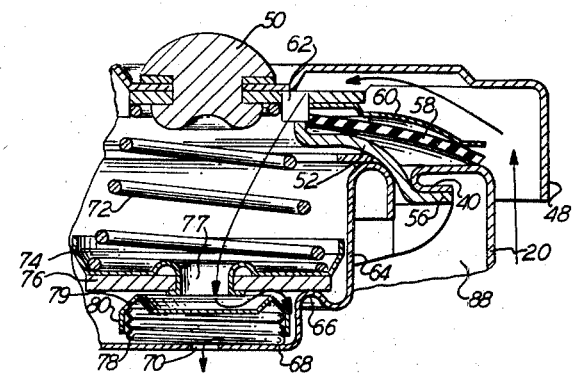
FIGURES 5 and 6 are operational views of the cap shown in FIGURE 4 with FIGURE 5 showing the position of the elements when air is being admitted into the air chamber, and FIGURE 6 showing the position of the elements when air is being vented from the air chamber.

As the engine withdraws fuel from fuel chamber 28, a partial vacuum forms inside the fuel tank. The force exerted by the atmospheric pressure on the upper surface of valve member 80 moves valve member 80 against the force exerted by spring 78 into the position shown in FIGURE 5. Air then passes around skirt 48, through holes 62, opening 77, around valve member 80, and through hole 70 into compartment 88 as represented by the arrows in FIGURE 5. From compartment 88 the air passes through vent tube 22 to air chamber 26 of the fuel tank. Spring 78 and valve member 80 are calibrated to move into the position shown in FIGURE 5 whenever a pressure differential of about 0.5 inch of mercury exists. The engine thus continues to draw fuel through tube 24, and diaphragm 18 remains substantially in contact with the surface of the fuel in fuel chamber 28.

Diaphragm 18 follows closely the fuel level in the tank. When the tank is full of fuel, diaphragm 18 assumes the position represented by dotted line 100. As fuel is withdrawn, the diaphragm moves to the position of dotted line 102, then position 18, and finally to the position represented by dotted line 104.

Figure 6:
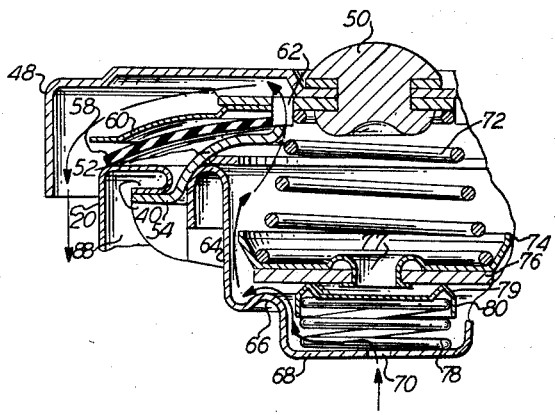

If the engine has been stopped and the temperature of the fuel in fuel chamber 28 increases, the vapor pressure of the fuel exerted on the lower side of diaphragm 18 increases the pressure in air chamber 26. If the pressure in air chamber 26 rises a predetermined amount above atmospheric pressure, the force exerted by the pressure differential acts on the lower side of valve member 80 to urge valve disc 74 away from seat 66 as shown in FIGURE 6. Excess air from chamber 26 then escapes to the atmosphere via vent tube 22, compartment 88, hole 70, and holes 62 as represented by the arrows in FIGURE 6. A typical pressure differential producing the arrangement shown in FIGURE 6 is about 2.0 p.s.i.

In the event that the fuel vapors in fuel chamber 28 expel all of the air from air chamber 26 in the manner just described, continued fuel evaporation could develop a pressure sufficient to burst the tank. To prevent this hazard, valve member 84 moves off seat 86 when the pressure in fuel chamber 28 reaches the danger point. A typical pressure differential unseating member 84 is about 2.5 p.s.i. Since a smaller pressure differential unseats disc 74, the excess vapors escape to the atmosphere.

When it is necessary to replenish the amount of fuel in lower chamber 28, cap assembly 44 is turned counterclockwise to move tabs 54 and 56 to the outer ramps 38. In this position, sealing member 58 no longer seals against outer surface 35 of the filler tube. Spring 82 maintains valve member 84 in contact with seat 86, however, so only the excess air in air chamber 26 escapes to the atmosphere by passing through tube 22, compartment 88 and around member 52. Continued counterclockwise rotation of the cap assembly positions tabs 54 and 56 in ear portions 34 and 36, permitting removal of the cap assembly from the filler neck.

As fuel is added to chamber 28, diaphragm 18 moves upward toward position 100, thereby expelling air from chamber 26. A small amount of fuel vapor from chamber 28 also escapes to the atmosphere during the filling operation, but the amount is greatly reduced from that lost when filling a tank not equipped with the disclosed diaphragm and vent arrangement.

A two way check valve can be located directly in vent opening 14 if desired. Vent tube 22 then is eliminated, and a pressure cap capable of venting only the fuel chamber is used on the filler tube. The diaphragm can be one side of a flexible bag, with the volume contained by the bag serving either as the air chamber or the fuel chamber.

Thus, this invention provides a fuel tank that significantly reduces the amount of fuel vapor lost to the atmosphere during both engine operation and fuel replenishment. Fastening the diaphragm to the tank in a vertical plane eases some of the difficulties involved in replenishing the fuel at a reasonable rate and simplifies the design of the fuel gauge sending unit, which is usually inserted through opening 17 along with fuel line 24.

I claim:
1. In a vehicle fuel tank having a filler tube for supplying fuel to the tank and a removable cap means for the filler tube, means for reducing the amount of evaporation from the fuel in the tank comprising:
a flexible diaphragm separating the tank into a fuel chamber and an air chamber, said fuel chamber containing the fuel and communicating with the filler tube, said diaphragm being impervious to fuel vapor and being sufficiently flexible so a considerable por- tion of the diaphragm rests on the top of any fuel in the tank in the absence of large amounts of trapped fuel vapor, and check valve means included in the cap means, said check valve means connecting the air chamber to the atmosphere, said valve means permitting air flow out of the air chamber at a pressure differential greater than the pressure differential at which air flows into the air chamber.

2. The fuel tank of claim 1 in which the cap means includes a second check valve means, said second check valve means seating in the filler tube below the first check valve means and forming a compartment between the two check valve means, and passage means connecting the air chamber to said compartment.

3. The fuel tank of claim 2 in which the second check valve means permits flow out of the fuel chamber at a pressure differential greater than the pressure differential at which the first check valve means permits air flow out of the air chamber.

4. The fuel tank of claim 3 in which removal of the cap means opens said air chamber to the atmosphere before the fuel chamber.

5. The fuel tank of claim 4 in which the diaphragm is made of a laminate comprising a nylon sheet and a polyurethane sheet.

6. The fuel tank of claim 1 comprising check valve means connecting the fuel chamber to the atmosphere, said check valve means permitting fuel vapor to escape to the atmosphere at a pressure differential greater than the pressure differential at which air flows out of the air chamber.

7. The fuel tank of claim 1 in which the diaphragm is fastened to the tank in a vertical plane.

8. In a vehicle fuel tank having a filler tube for supplying fuel to the tank and a removable cap means for the filler tube, means for reducing the amount of evaporation from the fuel in the tank comprising:

a flexible diaphragm separating the tank into a fuel chamber and an air chamber, said fuel chamber containing the fuel and communicating with the filler tube, said diaphragm being impervious to fuel vapor and being sufficiently flexible so a considerable portion of the diaphragm rests on the top of any fuel in the tank in the absence of large amounts of trapped fuel vapor, said diaphragm being made of a laminate comprising a nylon sheet between two polyurethane sheets, and check valve means connecting the air chamber to the atmosphere, said valve means permitting air flow out of the air chamber at a pressure differential greater than the pressure differential at which air flows into the air chamber.

9. In a fuel tank having means dividing the tank interior into an air chamber and a fuel chamber, a filler tube communicating with the fuel chamber and means connecting the air chamber with the upper portion of said filler tube, a filler tube cap comprising means for admitting air into said air chamber and valve means preventing air from flowing into said fuel chamber while permitting fuel vapors to flow out of said fuel chamber at a relatively high pressure differential.

10. The fuel tank of claim 9 in which the cap comprises a depending skirt surrounding a portion of the filler tube end but spaced a short distance therefrom, said air flowing into the air chamber passing between said skirt and the filler tube.

11. The fuel tank of claim 10 in which the cap has projecting tabs fitting inside the filler tube and the filler tube has depending edges adapted to contact said tabs, said edges having a plurality of ramps at varying distances from the end of the filler tube so rotation of said cap moves the tabs progressively to each of said ramps.

References Cited

UNITED STATES PATENTS

| | | | |
|---|---|---|---|
| 2,133,200 | 10/1938 | Kenneweg | 220—44 |
| 2,383,369 | 8/1945 | Curtis | 220—85 XR |
| 2,653,780 | 9/1953 | Pepersack | 220—85 XR |
| 2,684,780 | 7/1954 | Friend | 220—44 XR |
| 3,071,285 | 1/1963 | Friend | 220—44 |
| 3,083,862 | 4/1963 | Bowden | 220—44 |
| 3,328,225 | 6/1967 | Urbanic et al. | 161—190 |
| 3,347,406 | 8/1967 | Katzenmeyer | 220—22 |

RAPHAEL H. SCHWARTZ, Primary Examiner

U.S. Cl. X.R.

220—22, 44